United States Patent
Yaari et al.

(10) Patent No.: US 12,255,898 B1
(45) Date of Patent: Mar. 18, 2025

(54) MANAGEMENT OF ACCESS TO EXTERNAL AUTHORIZED SERVICES

(71) Applicant: Grip Security Ltd, Tel Aviv (IL)

(72) Inventors: Lior Chaim Yaari, Boston, MA (US); Idan Pinchas Fast, Tel Aviv (IL); Alon Shenkler, Tel Aviv (IL)

(73) Assignee: Grip Security Ltd, Tel Aviv (IL)

( * ) Notice: Subject to any disclaimer, the term of this patent is extended or adjusted under 35 U.S.C. 154(b) by 0 days.

(21) Appl. No.: 18/824,988

(22) Filed: Sep. 5, 2024

(51) Int. Cl.
  *H04L 9/40* (2022.01)
  *H04L 67/50* (2022.01)

(52) U.S. Cl.
  CPC ........ *H04L 63/102* (2013.01); *H04L 63/1433* (2013.01); *H04L 67/535* (2022.05)

(58) Field of Classification Search
  CPC .. H04L 63/102; H04L 63/1433; H04L 67/535
  See application file for complete search history.

(56) References Cited

U.S. PATENT DOCUMENTS

| | | | |
|---|---|---|---|
| 11,689,563 B1 | 6/2023 | Spitler | |
| 11,799,884 B1 | 10/2023 | Spitler | |
| 2010/0257598 A1* | 10/2010 | Demopoulos | H04L 63/1441 726/13 |
| 2012/0110645 A1* | 5/2012 | Spalka | G06F 21/6218 726/4 |
| 2022/0166736 A1* | 5/2022 | Freed | H04L 51/212 |
| 2023/0028528 A1* | 1/2023 | Mousseau | G06F 21/6281 |
| 2024/0064148 A1* | 2/2024 | Al-Essa | H04L 63/067 |

FOREIGN PATENT DOCUMENTS

| | | | | |
|---|---|---|---|---|
| CN | 108353080 A | * | 7/2018 | ......... G06F 21/6209 |
| WO | WO-0111452 A2 | * | 2/2001 | ............. G06F 21/41 |

* cited by examiner

*Primary Examiner* — Alina A Boutah (57) ABSTRACT

There is provided a method of automatically managing access to authorized service computing environments, comprising: monitoring data sources generated by user identities of the target computing environment accessing service computing environments, analyzing the data sources to identify communication between user identities of the target computing environment and the service computing environments, according to the analyzing, mapping connections between the user identities of the target computing environment and the service computing environment, including connections between first user identities that are authorized to access authorized service computing environments, second user identities that are non-authorized to access the authorized service computing environments, and third user identities that are non-authorized to access non-authorized service computing environments, and automatically blocking access of the second user identities to the authorized service computing environments that they are non-authorized to access, and automatically blocking access of the third user identities to access non-authorized service computing environments.

21 Claims, 3 Drawing Sheets

MANAGEMENT OF ACCESS TO EXTERNAL AUTHORIZED SERVICES

BACKGROUND

The present invention, in some embodiments thereof, relates to network security and, more specifically, but not exclusively, to systems and methods for managing access to external authorized services.

Services are being migrated from on-premises solution, to cloud-based software as a service (SaaS) solutions. The reliance on external entities to provide software services over a network connection creates a security risk for computing environments using the external services.

SUMMARY

According to a first aspect, a computer implemented method of automatically managing access to a plurality of authorized service computing environments from a target computing environment, comprises: monitoring a plurality of data sources generated by a plurality of user identities of the target computing environment accessing a plurality of service computing environments, analyzing the plurality of data sources to identify communication between user identities of the target computing environment and the plurality of service computing environments, according to the analyzing, mapping connections between the user identities of the target computing environment and the plurality of service computing environment, including connections between first user identities that are authorized to access authorized service computing environments, second user identities that are non-authorized to access the authorized service computing environments, and third user identities that are non-authorized to access non-authorized service computing environments, and automatically blocking access of the second user identities to the authorized service computing environments that they are non-authorized to access, and automatically blocking access of the third user identities to access non-authorized service computing environments.

According to a second aspect, a system for automatically managing access to a plurality of authorized service computing environments from a target computing environment, comprises: at least one processor executing a code for: monitoring a plurality of data sources generated by a plurality of user identities of the target computing environment accessing a plurality of service computing environments, analyzing the plurality of data sources to identify communication between user identities of the target computing environment and the plurality of service computing environments, according to the analyzing, mapping connections between the user identities of the target computing environment and the plurality of service computing environment, including connections between first user identities that are authorized to access authorized service computing environments, second user identities that are non-authorized to access the authorized service computing environments, and third user identities that are non-authorized to access non-authorized service computing environments, and automatically blocking access of the second user identities to the authorized service computing environments that they are non-authorized to access, and automatically blocking access of the third user identities to access non-authorized service computing environments.

According to a third aspect, a non-transitory medium storing program instructions for automatically managing access to a plurality of authorized service computing environments from a target computing environment, which when executed by at least one processor, cause the at least one processor to: monitor a plurality of data sources generated by a plurality of user identities of the target computing environment accessing a plurality of service computing environments, analyze the plurality of data sources to identify communication between user identities of the target computing environment and the plurality of service computing environments, according to the analyzing, map connections between the user identities of the target computing environment and the plurality of service computing environment, including connections between first user identities that are authorized to access authorized service computing environments, second user identities that are non-authorized to access the authorized service computing environments, and third user identities that are non-authorized to access non-authorized service computing environments, and automatically block access of the second user identities to the authorized service computing environments that they are non-authorized to access, and automatically block access of the third user identities to access non-authorized service computing environments.

In a further implementation form of the first, second, and third aspects, analyzing comprises linking the plurality of data sources associated with the plurality of service computing environments to individual user identities.

In a further implementation form of the first, second, and third aspects, analyzing comprises: determining context of access and usage patterns including at least one of: time of access to the plurality of service computing environments, frequency of access to the plurality of service computing environments, technical metadata of a computer used to access the plurality of service computing environments, and organization position of the plurality of user identities, and detecting anomalies associated with likelihood of a security risk according to the context of access and/or usage patterns.

In a further implementation form of the first, second, and third aspects, further comprising automatically sending a request for feedback to at least one of the plurality of user identities regarding access to the plurality of service computing environments, wherein a response to the request is analyzed for determining whether a respective user is authorized to access a certain service computing environment.

In a further implementation form of the first, second, and third aspects, further comprising automatically detecting at least one sub-type of the first user identities that are authorized to access authorized service computing environments, from the plurality of user identities.

In a further implementation form of the first, second, and third aspects, the first user identities are detected by analyzing patterns of administration of the plurality of service computing environments and/or financial transactions related to the plurality of service computing environments, to identify the first user identities as user identities with administrative and/or financial control.

In a further implementation form of the first, second, and third aspects, the first user identities are detected by analyzing an organization structure of the plurality of users and usage pattern of the plurality of service computing environments by the plurality of user identities.

In a further implementation form of the first, second, and third aspects, the first user identities are detected by analyzing a combination of: an order of adoption of the plurality of service computing environments, volume of usage of the plurality of service computing environments by the plurality of user identities, usage type, and/or frequency of actions.

In a further implementation form of the first, second, and third aspects, further comprising differentiating the authorized service computing environments and the unauthorized service computing environments from the plurality of service computing environments.

In a further implementation form of the first, second, and third aspects, the differentiating is performed by analyzing communication patterns associated with the monitored plurality of data sources to identify communication patterns initially appearing as likely related to authorized service computing environments, and further differentiating the communication patterns between communication patterns with authorized service computing environment and communication patterns with unauthorized service computing environment, wherein the further differentiating is performed by analyzing data sources include at least one of: email header, content patterns, network signatures, publicly available data, and behavioral patterns.

In a further implementation form of the first, second, and third aspects, the differentiating is performed by comparing a signature of each service computing environments created from the monitored plurality of data sources against a plurality of signatures of the authorized service computing environments and/or by analyzing a pattern of features extracted from the monitored data sources associated with each service computing environment relative to a baseline to detect deviations therefrom.

In a further implementation form of the first, second, and third aspects, the differentiating is performed by analyzing a type of a website and/or internal application associated with each service computing environment, wherein the authorized service computing environments and the unauthorized service computing environments are differentiated from each other according to each corresponding type of the website and/or internal application.

In a further implementation form of the first, second, and third aspects, analyzing comprises correlating a plurality of communications between a certain service computing environment and a plurality of user identities.

In a further implementation form of the first, second, and third aspects, the analyzing the plurality of data sources to identify communication comprises identifying a plurality of key data points indicating a pattern of usage of a certain service computing environment by the plurality of user identities, the plurality of key data points including at least one of: different tenants, names of the tenants, different source domains, different administrative configurations, and different instances of the service computing environment within the target computing environment.

In a further implementation form of the first, second, and third aspects, automatically blocking comprises automatically revoking access of the first user identities to the non-authorized service computing environments and/or automatically revoking access of the second user identities to the non-authorized service computing environments.

In a further implementation form of the first, second, and third aspects, monitoring comprises monitoring by browser extensions installed in web-browsers of client terminals accessing the plurality of service computing environments via the target computing environment excluding centralized routing through central identify providers and/or wherein the access is unlinked to a centrally managed system of the target computing environment.

In a further implementation form of the first, second, and third aspects, monitoring comprises accessing network traffic logs indicating the communication from at least one security system external to the target computing environment.

In a further implementation form of the first, second, and third aspects, monitoring comprises accessing at least one asset inventory system for differentiating service computing environments previously acknowledged by the target computing environment.

In a further implementation form of the first, second, and third aspects, the authorized service computing environment are authorized to be accessed by the first user identities and non-authorized to be accessed by the second user identities, and the unauthorized service computing environments are non-authorized to be accessed by the third user identities, wherein the third user identities include the first user identities and the second user identities.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to network security and, more specifically, but not exclusively, to systems and methods for managing access to external authorized services.

As used herein, the target computing environment and/or the service computing environment may include client terminal connected to them, and/or users using them. For example, access to the target computing environment may refer to access to users and/or client terminals of the target computing environment.

As used herein, the term service computing environment may refer to one or more applications, such as services, hosted and/or provided by the service computing environment. The term service computing environment may sometimes be interchanged with the term application hosted by and/or service(s) provided by, the service computing environment.

As used herein, the term non-authorized may be broader than the term unauthorized. The term unauthorized may refer to an explicit choice of something that the user isn't allowed to do. Whereas the term non-authorized may refer to anything that wasn't explicitly authorized, which is broader than the term unauthorized. The term non-authorized may refer to "tolerated" services that are not explicitly authorized, and not explicitly unauthorized, for example, users access a personal email web server via a network of an organization. The personal email web server has not been officially authorized for use by network administrator of the organization, but the personal email web server has also not been explicitly designated as unauthorized for use.

An aspect of the present invention relates to systems, methods, computing devices, and/or code instructions (stored on a data storage device and executable by one or more processors) for automatically managing access to authorized service computing environments from a target computing environment. Users use client terminals to access service computing environments via the target computing environments. For example, a user uses a laptop connects to a server (e.g., while working from home), such as via a virtual private network (VPN), and accesses a personal email account on an email web server via the server. The access to the personal email account via the server may pose a security risk to the server. The client terminals via the target computing environment may access authorized service computing environments (which may have been authorized for access, for example, by a network administrator after verification thereof) and non-authorized service computing environments (which may pose a security risk to the target computing environment). User identities may be authorized to access the authorized service computing environment (e.g., authorized email server providing email services to users), or may be non-authorized to access the authorized service computing environments (e.g., a lawyer is not authorized to access an accounting application hosted by a cloud). The service computing environments may include, for example, software as a service (SaaS), email, websites, and the like. Multiple data sources are monitored. The data sources are generated by multiple user identities of the target computing environment accessing multiple service computing environments, including authorized and non-authorized service computing environments. Examples of data sources include email related data, financial systems, data from identity providers (IdPs), data from web browsers running on client terminals accessing service computing environments via the target computing environment, and network logs. The data sources are analyzed to identify communication between user identities of the target computing environment and service computing environments. Connections between the user identities of the target computing environment and the service computing environment are mapped according to the analysis. The mapped connections include one or more of:

User identities (also referred to herein as first user identities, or user identities of a first type) that are authorized to access authorized service computing environments.

User identities (also referred to herein as second user identities, or user identities of a second type) that are non-authorized to access the authorized service computing environments.

User identities (also referred to herein as third user identities, or user identities of a third type) that are non-authorized to access non-authorized service computing environments. These user identities may include all users-no authorization may be granted to any user to access a non-authorized service computing environment. The third user identities may include the first and/or second user identities. Alternatively, the third user identities may refer to users for which non-authorization was explicitly assigned to non-authorized service computing environments. For example, part time employees may not be allowed to access their personal email via an external personal email server, whereas management may not.

Access of the second user identities to the authorized service computing environments may be blocked, automatically and/or manually (e.g., by an administrator). Access of the third user identities to access non-authorized service computing environments may be blocked, automatically and/or manually (e.g., by an administrator).

At least one embodiment described herein addresses the technical problem of maintain network security and/or inappropriate use of network resources, arising from use of services by client terminals accessing non-authorized service computing environments via a target service computing environment. For example, user accessing a server of their organization using a remotely located computer, and then accessing a personal email account on another remote server via the organizational server. Such actions pose a security risk to the organization server, by opening up a communication channel for malware and/or malicious actions from the remote email server to the organizational server. In another example, accessing the remote email server via the organizational server ties up processing resources of the organization server and/or ties up network resources of the network connecting the organization server, which are utilized for accessing the email server rather than being allocated to other client terminals legitimately using the organizational server. The technical challenge lies in determining which users are using the target computing environment to access non-authorized service computing environments. For example, since the same user may be authorized to access a certain service computing environment and not authorized to access a different service computing environment. In another example, one user may be authorized to access a certain service computing environment, while another user may be non-authorized to access the same certain service computing environment.

At least one embodiment described herein improves the technical field of network security and/or improving efficiency of network resources, arising from use of services by client terminals accessing non-authorized service computing environments via a target service computing environment. At least one embodiment described herein improves upon prior approaches of network security and/or improving efficiency of network resources, arising from use of services by client terminals accessing non-authorized service computing environments via a target service computing environment.

At least one embodiment described herein address the aforementioned technical problem, and/or improves the aforementioned technical field, and/or improves upon the aforementioned prior approaches, by monitoring data sources generated by user identities accessing multiple service computing environments, via client terminals accessing a target computing environment. The user identities are used to access authorized service computing environments and non-authorized service computing environments. Mapped connections between the user identities and the different service computing environments are generated. Access of user identities that are non-authorized to access authorized service computing environments, may be blocked. Alternatively or additionally, access of user identities that are non-authorized to access non-authorized service computing environments, may be blocked.

At least one embodiment described herein addresses the challenge of SaaS identity risk management by ingesting and/or analyzing data from multiple sources, for example, email, Identity Providers (IdPs), browsers, and network logs. This multi-source ingestion enables the creation of a detailed identity and access map across both sanctioned and unsanctioned SaaS applications, offering unprecedented visibility and control for security teams.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
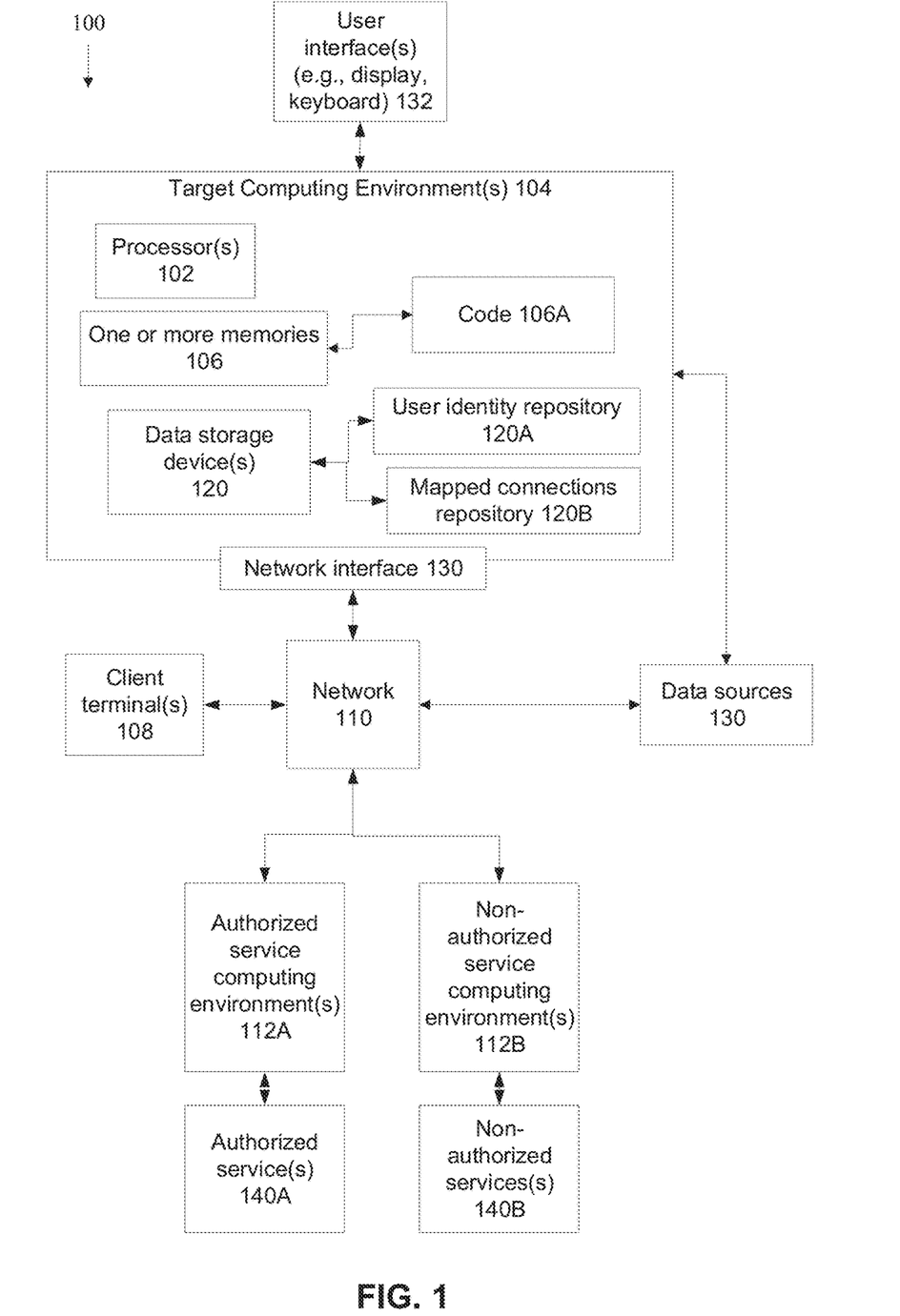
FIG. 1 is a block diagram of components of a system for automatically managing access to authorized service computing environments from a target computing environment, in accordance with some embodiments of the present invention.
Figure 2:
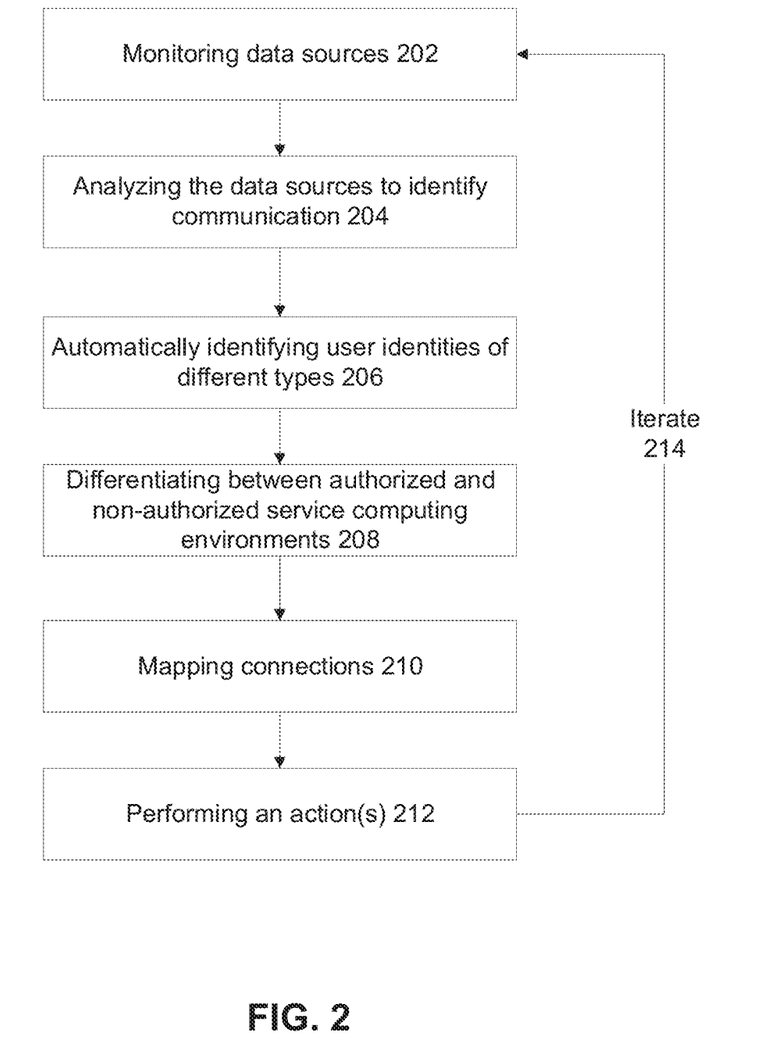
FIG. 2 is a flowchart of a method of automatically managing access to authorized service computing environments from a target computing environment, in accordance with some embodiments of the present invention.
Figure 3:
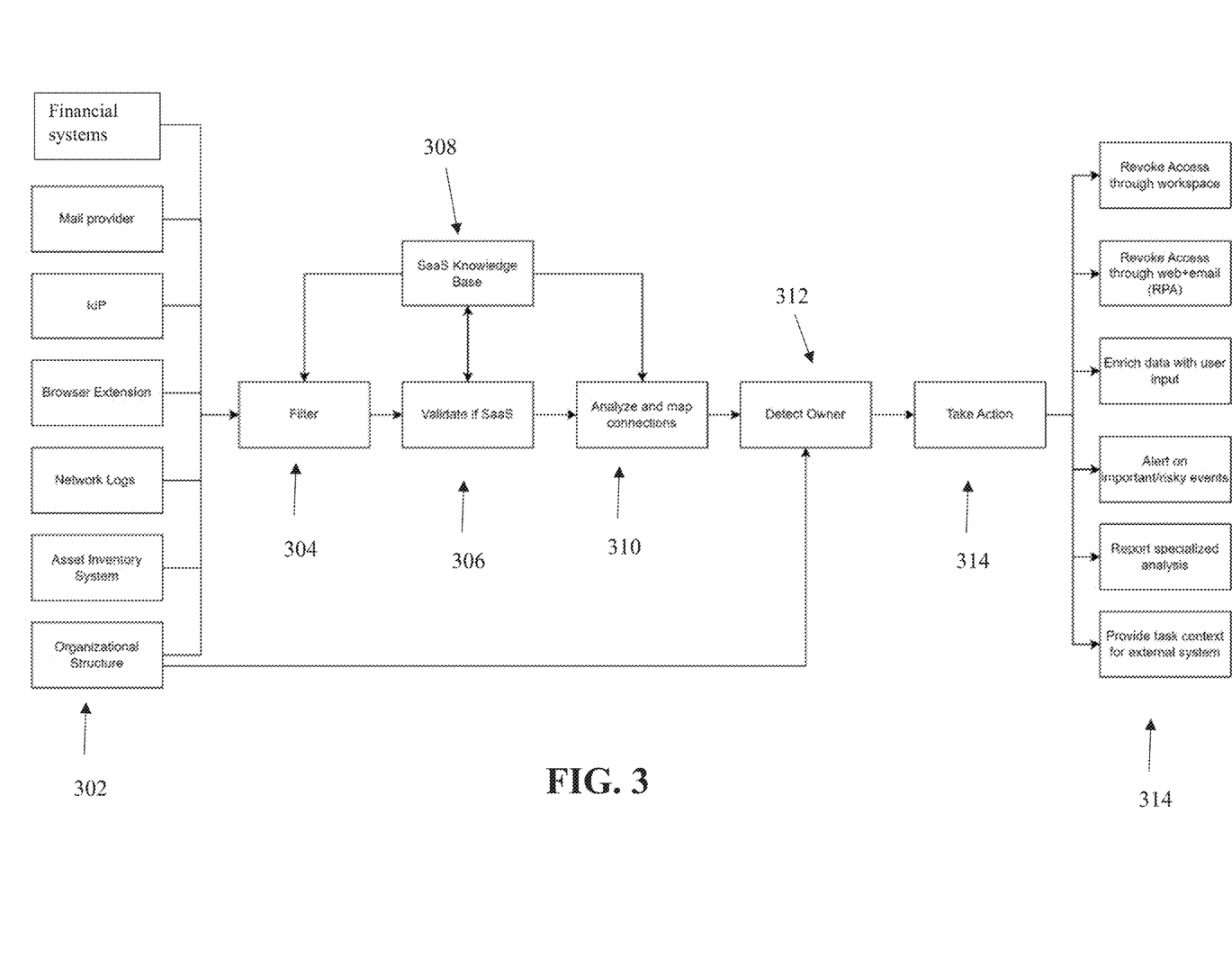
FIG. 3 is a data flow diagram for automatically managing access to authorized service computing environments from a target computing environment, in accordance with some embodiments of the present invention.

Reference is now made to FIG. 1, which is a block diagram of components of a system for automatically managing access to authorized service computing environments from a target computing environment, in accordance with some embodiments of the present invention. Reference is also made to FIG. 2, which is a flowchart of a method of automatically managing access to authorized service computing environments from a target computing environment, in accordance with some embodiments of the present invention. Reference is also made to FIG. 3, which is a data flow diagram for automatically managing access to authorized service computing environments from a target computing environment, in accordance with some embodiments of the present invention.

System 100 may implement the acts of the method described with reference to FIGS. 2-3 by processor(s) 102 of target computing environment 104 executing code instructions 106A stored in a memory 106 (also referred to as a program store).

Target computing environment 104 may be implemented as, for example one or more and/or combination of: a computing cloud, a group of connected devices, a server, a virtual server, a client terminal, a virtual machine, a desktop computer, a thin client, a network node, and/or a mobile device (e.g., a Smartphone, a Tablet computer, a laptop computer, a wearable computer, glasses computer, and a watch computer).

Target computing environment 104 monitors data sources 130 generated by user identities (e.g., hosted by a user identity repository 120A) accessing multiple service computing environments, which include authorized service computing environments 112A and non-authorized service computing environments 112B. Mapped connections between the user identities and the different service computing environments are generated, and may be stored in a mapped connections repository 120B. Access of user identities that are non-authorized to access authorized service computing environments 120A, may be blocked. Alternatively or additionally, access of user identities that are non-authorized to access non-authorized service computing environments 112B, may be blocked.

One or more client terminals 108 access target computing environment 104 using respective user identities (e.g., stored in user identity repository 120A), optionally via network 110. The client terminals 108 may access multiple service computing environments, which include authorized service computing environments 112A and non-authorized service computing environments 112B via target computing environment 104 using their respective identities.

Authorized service computing environment(s) 112A and/or non-authorized service computing environment(s) 112B may provide one or more services to the client terminals 108 accessing target computing environment 104, for example, authorized service 140A such as an authorized application (e.g., SaaS) and non-authorized service 140B such as an non-authorized application (e.g., SaaS), respectively. Authorized and non-authorized service computing environments 112A-B may be implemented as, for example, servers, web servers, computing clouds, virtual servers, and the like.

Processor(s) 102 of target computing environment 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIGS. 2-3 when executed by processor(s) 102.

Target computing environment 104 may include a data storage device 120 for storing data, for example, a user identity repository 120A set to store user identities of users and which service computing environments they are authorized to access, mapped connection repository 120B set to store mapped connections between user identities and which service computing environments they are accessing, and other data described herein. Data storage device 120 may be implemented as, for example, a memory, a local hard-drive, virtual storage, a removable storage unit, an optical disk, a storage device, and/or as a remote server and/or computing cloud (e.g., accessed using a network connection).

Computing environment 104 may include a network interface 130 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Network 110 may be implemented as, for example, the internet, a local area network, a virtual network, a wireless network, a cellular network, a local bus, a point to point link (e.g., wired), and/or combinations of the aforementioned.

Target computing environment 104 and/or client terminals 108 may include and/or may be in communication with one or more physical user interfaces 132 that include a mechanism for a user to enter data and/or view data. Exemplary user interfaces 132 include, for example, one or more of, a touchscreen, a display, a virtual reality display (e.g., headset), gesture activation devices, a keyboard, a mouse, and voice activated software using speakers and microphone.

Referring now back to FIG. 2, at 202, multiple data sources are monitored.

The data sources generate data in response to user identities of the target computing environment accessing multiple service computing environments, including authorized and non-authorized service computing environments. The service computing environments are accessed by client terminals via the target computing environment, using respective user identities. The user identities may have different authorization levels for different authorized service computing environments, for example, one user identity is non-authorized to access a certain authorized service computing environment, while another user identity is authorized to access the same certain authorized service computing environment.

Examples of data sources include:

Email Systems: Communication between users and service computing environments may be identified by analyzing email metadata and/or content of emails. Roles of different user identities may be determined. Interactions with different apps may be determined. For example, which email server user identities access via the target computing environment, such as private non-authorized servers or authorized servers. In another example, a user may receive emails from an online game that they play and access via the target computing environment, such as advertising new stories of the online game and/or indicating which players are the highest ranked. In yet another example, content of emails may be analyzed to determine that a certain user is a human resources officer, such as emails that include resumes sent by different people to the human resources officer.

Identity Providers (IdPs): The IdPs may provide identity authentication services to the target computing environment for authentication of user identities attempting to access service computing environments via the target computing environment. The IdPs data source may be implemented as an IdP interface, for example, an application programming interface (API). API integrations with IdPs may enable fetching authentication and/or authorization data, which may be analyzed for providing insights into authorized services, user identity roles, permissions, and/or activities within the different service computing environments.

Browser extensions: Monitoring may be performed by browser extensions installed in web-browsers of client terminals accessing the service computing environments via the target computing environment. The browser extensions may capture real-time user activity directly from the user's browser running on the client terminal of the user. The web-browsers may obtain usage patterns of client terminals accessing the service commuting environments. The access may exclude centralized routing through central identify providers, i.e., usage patterns that are not routed through central IdPs. Usage patterns and/or access may be unlinked to a centrally managed system of the target computing environment, for example, access may be unlinked to centrally managed email.

Network logs: Network traffic logs may be provided by one or more external systems, for example, a network security system, CASB (Cloud Assist Security Broker), SWG (Secure Web Gateway), and/or SSE (Secure Service Edge). The network traffic logs may be analyzed for determining (e.g., a holistic view) of communication by the client terminals via the target computing environment to the service computing environment, for example, how services provided by the service computing environments are being consumed by user identities of the target computing environment. The analysis may provide additional details over a purely network based solution.

Organizational Structure: An indication of an organization structure of user identities using the target computing environment may be obtained and/or generated. The organization structure may be obtained from, and/or generated based on data from, data sources such as service computing environments accessed by the target computing environment. For example, email workspace, IdP, and HIRS (Human Resources Information System). The organization structure may add contextual information, which may help (e.g., guide security teams) with assessing how service computing environments are being utilized by user identities access the target computing environment (e.g., in their organization).

Asset Inventory System and/or Financial System: One or more asset inventory systems and/or financial systems may be accessed for differentiating service computing environments previously acknowledged by the target computing environment. The asset inventory system and/or financial system may indicate which service computing environments are authorized for use by user identities, optionally via the target service environment. Service computing environments accessed by user identities optionally via the target service environment may be differentiated into authorized and non-authorized according to the asset inventory system and/or financial system. Examples of asset inventory systems and/or financial systems include: CMDB (Configuration Management Database), TPRM (Third-Party Risk Management), VRM (Vendor Risk Management), APM (Application Portfolio Management).

At 204, the data sources are analyzed to identify communication between user identities of the target computing environment and the service computing environments.

Data from the different and/or diverse data sources may be correlated to construct a service computing environment identity and/or access landscape, also referred to herein as mappings.

The analysis may include one or more of the following:

Identity Correlation: Linking different data elements obtained from the data sources across different service computing environment to individual user identities. For example, mapping data from a certain web browser extension to a user identity that used the web browser to access certain service computing environments. In another example, mapping data extracted from emails to a user identity listed as a sender, receiver, cc'd, and/or mentioned in the body of the email, to the service computing environment that sent the email and/or which is destined to receive the email.

Correlating communications between a certain service computing environment, optionally each identified service computing environment, and each of the user identities. For example, which user identity accessed which service computing environment, which service computing environment sent messages and/or other data to which user identity, and the like.

Context of access and/or usage patterns may be determined and/or analyzed (e.g., to understand the context). The context and/or usage pattern and/or outcome of the analysis may include one or more of: time of access to the service computing environments, frequency of access to the service computing environments, technical metadata of a computer used to access the plurality of service computing environments (e.g., IP address), usage type (e.g., some interactions are highly correlated with a primary user such as identifying multiple administrative settings), sub-type of user (e.g., as described herein), frequency of actions, and/or organization position of the user identities. A primary user may be a user with increased privileges, such as an administrator and/or manager, for example, with privileges to make changes to configuration parameters, increased privileges to access certain data, and the like. The analysis may be performed for detecting anomalies associated with likelihood of a security risk according to the context of access and/or usage patterns.

User feedback: Unfamiliar and/or non-authorized and/or underutilized service computing environment accessed by the user identities of the target computing environment may be detected. Certain user identities may be automatically contacted (e.g., by email, message to a mobile device, phone call) such as by sending a survey, questionnaire, generative model designed to hold a conversation, to obtain context (e.g., to enrich the whole picture) which may enable reaching a decision and/or taking appropriate action, automatically and/or manually by a security team. The user identities that may be contacted may be user identities of the first type, which may be automatically identified, for example, as described with reference to 206.

At 206, types of the user identities that access the service computing environments, optionally via the target computing environment, may be automatically determined.

Optionally, user identities of the first type may be automatically identified from the multiple user identities. The user identities of the first type refer to user identities that are authorized to access authorized service computing environments, optionally via the target computing environment. It is noted that other user identities may be non-authorized to access the same authorized service computing environments.

Alternatively or additionally, one or more sub-types of the user identities of the first type may be automatically detected, for example, billing owner, business owner, primary user, and the like. Access may be granted according to sub-type, based on embodiments described herein. The sub-types may be detected, for example, by accessing records associated with the user identities, analyzing access patterns of the user identities (e.g., type of data they access), accessing metadata associated with the user identities (e.g., job title, company profile), and the like.

Alternatively or additionally, user identities of the second type and/or third type may be automatically identified from the multiple users.

The user identities of the first and/or second and/or third type may be automatically identified by one or more of the following approaches:

By analyzing patterns of administration of the service computing environments and/or financial transactions related to the service computing environments (respectively), user identities may be designated as user identities with administrative and/or financial control (respectively). For example, identifying a certain user that sends emails to and/or receives emails from an accounting email of a certain service computing environment may be identified as a user with financial control. In another example, the browser extension installed in a web browser of a certain user may identify that the certain user is able to log into an administrative control panel of a certain service computing environment for defining different control features. In another example, a financial system may identify a certain user who holds financial, administrative or licensing roles within the service. The certain user may be identified as a user with administrative control. User identities identified as having administrative and/or financial control may be identified as user identities of the first type. Other users which are not identified as having administrative and/or financial control may be identified as user identities of the second and/or third type.

By analyzing an organization structure of users and corresponding user identities, and/or analyzing usage pattern of each of the service computing environments by the user identities, the type of user identity may be automatically determined. For example, user identities higher up on an organizational structure with high usage pattern may be identified as user identities of the first type. In another example, user identities lower down on the organizational structure with lower usage pattern may be identified as user identities of the second and/or third type. Machine learning models and/or heuristics may be used to analyze the organization structure and/or usage pattern. For example, a user that accesses two email servers, one email which is listed in the organization structure and a second email which is not, may be determined to be authorized to access the first email server and non-authorized to access the second email server. In another example, user identities at a top tier may be granted authorization to access a project management service while users identities at a lower tier may be non-authorized to access the same service.

By analyzing patterns of usage of different service computing environments by different user identities, for example, analyzing behaviors of the different user identities. A combination of one or more of the following may be analyzed: an order of adoption of the service computing environments by different user identities, volume of usage of the service computing environments by the different user identities, usage type (e.g., some interactions have high correlation with being performed by a first user, such as changing administrative settings), and/or frequency of actions performed by the user identity (e.g., access to certain data, changing of settings, and the like). The user identities of a first type, and/or certain sub-type (e.g., indicating primary user), of each service computing environment may be identified such as user identities which access a certain computing environment the largest number of times, for the longest amount of time, and/or for performing the widest range of actions. The primary user identities may be identified as user identities of the first type, optionally a sub-type of the first type. Non-primary users may be identified as user identities of the second and/or third type, and/or as other sub-types of the first type.

At 208, authorized service computing environments and non-authorized service computing environments may be differentiated from one another. For example, a certain service computing environment may be classified as authorized or non-authorized. The authorized and non-authorized service computing environments are accessed by the user identities, optionally via the target service environment.

The differentiation may be performed, for example, by one or more of the following approaches:

By analyzing communication patterns associated with the monitored data sources initially, communication patterns appearing as likely related to authorized service computing environments may be identified. The monitored data initially appearing at likely related to authorized service computing environments may be include communication and/or usage data. The communication patterns initially appearing as likely related to authorized service computing environment may be identified, for example, using heuristic analysis and/or machine learning models to identify a pattern of the monitored data sources that does not significantly deviate from patterns known to be related to authorized service computing environments, and/or does not include anomalies. The communication patterns initially identified as likely related to authorized service computing environments may be further differentiated between communication patterns with authorized service computing environment and communication patterns with non-authorized service computing environment. The further differentiating may be performed by analyzing data sources include at least one of: email header, content patterns, network signatures, publicly available data about the service itself (hosted by the authorized service computing environment) which may be obtained, for example, by analyzing a website of the service to better understand its offering and/or behavior, and behavioral patterns.

By comparing a signature of each service computing environments being evaluated against signatures of known authorized service computing environments. The signature may be created from the monitored data sources, such as during communication sessions of authorized user identities with the known service computing environments. The comparison of signatures may be performed, for example, by matching signatures, matching hashes of signatures, computing correlations between signatures where a correlation value greater than a threshold indicates a match, and feeding the signature into a machine learning model trained on a training datasets of records, where a record includes a sample signature and a ground truth indicating whether the service computing environment communicated with in the sample signature is authorized or non-authorized. The signature may be represented as, for example, a record with multiple fields, a vector which may be created from data such as by feeding the data into a machine learning model and extracting a hidden layer, and/or feeding the data into a vectorization process, and the like. The signature may include one or more or combination of the following data elements which may be obtained from the monitored data sources: email domain, site URL, sign-in URL, logo, public information available describing the service, technical identity metadata related to the service, technical configuration data related to the service, and user feedback.

By comparing a pattern of features extracted from the monitored data sources associated with each service computing environment relative to a baseline to detect deviations from the baseline. The baseline may be of features extracted from monitored data sources known to be associated with authorized service computing environments.

By analyzing a type of a website associated with each service computing environment. It is noted that features described herein with reference to the website may be applied to internal applications and/or services not accessible to the general public. The type of website may be indicative of an authorized service environment or non-authorized service environment. The authorized service computing environments may be differentiated from the non-authorized service computing environments according to each corresponding type of website. For example, a website to an online project management application may be determined to be associated with an authorized service computing environment. In another example, a website of a news source, an online game, and/or personal-user application, may be determined to be associated with an non-authorized service computing environment. The type of website may be determined, for example, by extracting features of the website, and feeding the features into a machine learning model trained on a training dataset of records of sample features extracted from sample websites labelled with a ground truth indicating whether the corresponding website is associated with an authorized or non-authorized service computing environment. Examples of features include: images, text, content, links to other websites, presence of ads and which ads, key terms, hosting server, URL, pattern of usage by a user, and the like.

At 210, connections are mapped between the user identities (of the target computing environment) and the service computing environment. The connections may be mapped according to the analysis, for example, described herein.

Exemplary mappings include:

Connections between first user identities that are authorized to access authorized service computing environments, and the service computing environments that the first user identities access.

Connections between second user identities that are non-authorized to access the authorized service computing environments, and the service computing environments that the second user identities access.

Connections between third user identities that are non-authorized to access non-authorized service computing environments, and the service computing environments that the third user identities access.

The mappings may be generated by clustering detected communications between the different user identities and service computing environments, optionally according to outcomes of the analysis described herein.

The mappings may be determined by iteratively correlating outcomes of the analysis described herein (e.g., detections described herein) and/or matching data of the different data sources, which may provide a more account mapping.

The mappings may relate to a certain service computing environment (e.g., same vendor, same application) which may communicate with its users (i.e., user identities) in ways that could be detected by one or more of the monitored data sources described herein. These detected service computing environments and/or communications may be mapped to indicate a unified view of how the service computing environment is being utilized by different user identities.

Optionally, key data points indicting a pattern of usage of a certain service computing environment by the user identities may be detected. The different key data points may be associated with different patterns of consumption of the service computing environment (e.g., application hosted by the service computing environment). Examples of key points include: different tenants, names of the tenants, different source domains, different administrative configurations (e.g., by identifying two different Okta configurations for Dropbox, it may be learned that there are possibly two different Dropbox instances/tenants in use) and different instances of the service computing environment within the target computing environment. The mappings may be based on the different key points.

At 212, one or more actions may be automatically triggered in response to the mappings. Exemplary actions include:

- Automatically blocking access of the second user identities to the authorized service computing environments. The second user identities are denied access to service computing environments to which they are non-authorized to access, but to which other user identities are authorized to access. For example, the user identities are of employees on a lower tier within the organization, attempting to access service computing environments which are authorized only to employees on a higher tier.
- Automatically blocking access of the third user identities to access non-authorized service computing environments. Access to the non-authorized service computing environments may be denied to all user identities of the target environment, for example, no employees may be allowed to access online game servers and/or certain personal application sites.
- Automatically revoking access of the first user identities to the authorized service computing environments.
- Automatically revoking access of the first user identities to the non-authorized service computing environments.
- Automatically revoking access of the second user identities to the non-authorized service computing environments.
- Automatically authorizing a user identity to access an authorized service computing environment for which the user identity was previously non-authorized to access. For example, for two user identities which are similar to one another (e.g., similar level on an organizational chart) where one user is authorized to access a certain service computing environment and the other user is not authorized to access the certain service computing environment, the other user may be authorized to access the certain service computing environment.
- Automatically blocking access of all user identities to a certain service computing environment. For example, where the certain service computing environment is non-authorized, potentially posting a cyber security risk, but still accessed by many user identities.
- Contact one or more user identities to inquire, for example, about usage of service computing environments and/or nature of access of service computing environments. The usage may be for authorized and/or non-authorized service computing environments. A request for feedback may be send to the user identities. The request may be for feedback regarding use of the respective user identity in accessing one or more service computing environments, for example, what is the service computing environment being used for, preferred mode of access, satisfaction with the access, and the like. The feedback may be for unknown states regarding the authority of the service computing environment and/or user identities. The most relevant user identities to contact may be identified, for example, user identities with highest usage, user identities matching a certain usage pattern, and the like. The user identities may be automatically contacted via one or more channels, for example, by email, sending a message (e.g., SMS) to a mobile device, a phone call and the like. The inquiry may be done, for example, via a survey, a questionnaire, a generative model designed to hold a conversation to ask certain questions, and the like. The feedback may be analyzed for determining whether a respective user is authorized to access a certain authorized service computing environment. The feedback request may be sent to one or more primary users, rather than to a large number of user identities. The primary users may be identified, for example, as the users with financial and/or administrative control, and/or other primary users, which may be identified, for example, as described with reference to 206 of FIG. 2.
- Forward data (e.g., mappings) to another process, which may be locally executing and/or running on a remote device. The data may be ingested and/or analyzed, and then exported the detected data. Configurable filters may be applied to the data being forwarded. Data may be forwarded based on multiple pre-defined reporting. Data may be automatic exported to any other systems, for example, SIEM (Security Information and Event Management), BI (Business Intelligence), ITSM (IT Service Management), automation systems, SOAR systems, and/or ticketing systems.
- Tickets may be created. The target computing environment may be with external ticketing systems such as ITSM to allow for an automatic and/or streamlined approach to incorporate the data detected as described herein (e.g., mappings) within existing organization processes.
- Presenting data on a display, forwarding to a remote device, storing on a data storage device, printing, and the like. For example, presenting the key points which may be identified as described herein, which may enable an administrative user to analyze the way an application hosted by a certain service computing environment is being utilized by the user identities of the target computing environment.

Access revocation may be done manually and/or automatically, for example, based on a policy and/or external triggers. Revocation may be for any of the identified user identity-service computing environments that were detected and/or mapped. For example, an OAuth grant given to a certain service computing environment with connection to a certain user identity, and/or as unmanaged password-based usage via a sophisticated RPA (robotic process automation) password reset process.

The blocking access and/or other actions triggered in response to the mappings may be implemented by one or more external systems integrated with the target computing environment, for example, a security system to block access to non-authorized service computing environment (e.g., unsanctioned applications).

At 214, one or more features described with reference to 202-212 may be iterated. Iterations may be performed, for example, continuously, at predefined internals, and/or in response to events. Iterations may be performed by dynamically detecting changes in access patterns by user identities and/or for detecting new accesses to new service computing environments, for example, a trend in users accessing a certain personal application, and/or a trend is users choosing to use a certain authorized application over another similar authorized application, and the like. The iterations may dynamically adapted to changes in access patterns to reduce or prevent new cyber security vulnerabilities arising from the changes in access patterns.

Referring now back to FIG. 3, features of the dataflow diagram described with reference to FIG. 3 may be implemented by components of system 100 described with reference to FIG. 1, and/or may correspond to, and/or be implemented by, and/or be combined with, and/or may be alternatives to, and/or may include, one or more features of the method described with reference to FIG. 2.

At 302, data sources are monitored, for example, as described with reference to 202 of FIG. 2. Examples of monitored data sources include: email provider, IdP, browser extension, network logs, asset inventory system, and organization structure.

At 304, the data sources may be filtered and/or analyzed. For example, the data sources may be filtered according to associated service computing environments and/or according to associated user identities.

At 306, a differentiation between authorized and non-authorized service computing environments may be made. For example, whether each service computing environment is a validated SaaS (authorized to be used by user identities) or not. For example, as described with reference to 208 of FIG. 2.

At 308, the differentiation may be made by obtaining a signature of the service computing environment and matching and/or comparing to signatures of known authorized service computing environments, for example, as described herein.

At 310, connections may be analyzed and/or mapped, for example, as described with reference to 204 and/or 210 of FIG. 2.

At 312, user identities (e.g., owners) of different types may be detected, for example, as described with reference to 206 of FIG. 2.

At 314, one or more actions may be taken, for example, as described with reference to 212 of FIG. 2. Exemplary actions include: revoking access through workspace, revoking access through web+email (RPA), enriching data with user input, alerting on important/risky events, reporting specialized analysis, and providing task context for external system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant computing environments will be developed and the scope of the term computing environment is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of automatically managing access to a plurality of authorized service computing environments from a target computing environment, comprising:
    monitoring a plurality of data sources generated by a plurality of user identities of the target computing environment accessing a plurality of service computing environments;
    analyzing the plurality of data sources to identify communication between user identities of the target computing environment and the plurality of service computing environments;
    according to the analyzing, mapping connections between the user identities of the target computing environment and the plurality of service computing environment, including connections between first user identities that are authorized to access authorized service computing environments, second user identities that are non-authorized to access the authorized service computing environments, and third user identities that are non-authorized to access non-authorized service computing environments; and
    automatically blocking access of the second user identities to the authorized service computing environments that they are non-authorized to access, and automatically blocking access of the third user identities to access non-authorized service computing environments.

2. The computer implemented method of claim 1, wherein analyzing comprises linking the plurality of data sources associated with the plurality of service computing environments to individual user identities.

3. The computer implemented method of claim 1, wherein analyzing comprises:
    determining context of access and usage patterns including at least one of: time of access to the plurality of service computing environments, frequency of access to the plurality of service computing environments, technical metadata of a computer used to access the plurality of service computing environments, and organization position of the plurality of user identities; and
    detecting anomalies associated with likelihood of a security risk according to the context of access and/or usage patterns.

4. The computer implemented method of claim 1, further comprising automatically sending a request for feedback to at least one of the plurality of user identities regarding access to the plurality of service computing environments, wherein a response to the request is analyzed for determining whether a respective user is authorized to access a certain service computing environment.

5. The computer implemented method of claim 1, further comprising automatically detecting at least one sub-type of the first user identities that are authorized to access authorized service computing environments, from the plurality of user identities.

6. The computer implemented method of claim 5, wherein the first user identities are detected by analyzing patterns of administration of the plurality of service computing environments and/or financial transactions related to the plurality of service computing environments, to identify the first user identities as user identities with administrative and/or financial control.

7. The computer implemented method of claim 5, wherein the first user identities are detected by analyzing an organization structure of the plurality of users and usage pattern of the plurality of service computing environments by the plurality of user identities.

8. The computer implemented method of claim 1, wherein the first user identities are detected by analyzing a combination of: an order of adoption of the plurality of service computing environments, volume of usage of the plurality of service computing environments by the plurality of user identities, usage type, and/or frequency of actions.

9. The computer implemented method of claim 1, further comprising differentiating the authorized service computing environments and the unauthorized service computing environments from the plurality of service computing environments.

10. The computer implemented method of claim 9, wherein the differentiating is performed by analyzing communication patterns associated with the monitored plurality of data sources to identify communication patterns initially appearing as likely related to authorized service computing environments, and further differentiating the communication patterns between communication patterns with authorized service computing environment and communication patterns with unauthorized service computing environment, wherein the further differentiating is performed by analyzing data sources include at least one of: email header, content patterns, network signatures, publicly available data, and behavioral patterns.

11. The computer implemented method of claim 9, wherein the differentiating is performed by comparing a signature of each service computing environments created from the monitored plurality of data sources against a plurality of signatures of the authorized service computing environments and/or by analyzing a pattern of features extracted from the monitored data sources associated with each service computing environment relative to a baseline to detect deviations therefrom.

12. The computer implemented method of claim 9, wherein the differentiating is performed by analyzing a type of a website and/or internal application associated with each service computing environment, wherein the authorized service computing environments and the unauthorized service computing environments are differentiated from each other according to each corresponding type of the website and/or internal application.

13. The computer implemented method of claim 1, wherein analyzing comprises correlating a plurality of communications between a certain service computing environment and a plurality of user identities.

14. The computer implemented method of claim 1, wherein the analyzing the plurality of data sources to identify communication comprises identifying a plurality of key data points indicating a pattern of usage of a certain service computing environment by the plurality of user identities, the plurality of key data points including at least one of: different tenants, names of the tenants, different source domains, different administrative configurations, and different instances of the service computing environment within the target computing environment.

15. The computer implemented method of claim 1, wherein automatically blocking comprises automatically revoking access of the first user identities to the non-authorized service computing environments and/or automatically revoking access of the second user identities to the non-authorized service computing environments.

16. The computer implemented method of claim 1, wherein monitoring comprises monitoring by browser extensions installed in web-browsers of client terminals accessing the plurality of service computing environments via the target computing environment excluding centralized routing through central identify providers and/or wherein the access is unlinked to a centrally managed system of the target computing environment.

17. The computer implemented method of claim 1, wherein monitoring comprises accessing network traffic logs indicating the communication from at least one security system external to the target computing environment.

18. The computer implemented method of claim 1, wherein monitoring comprises accessing at least one asset inventory system for differentiating service computing environments previously acknowledged by the target computing environment.

19. The computer implemented method of claim 1, wherein the authorized service computing environment are authorized to be accessed by the first user identities and non-authorized to be accessed by the second user identities, and the unauthorized service computing environments are non-authorized to be accessed by the third user identities, wherein the third user identities include the first user identities and the second user identities.

20. A system for automatically managing access to a plurality of authorized service computing environments from a target computing environment, comprising:
at least one processor executing a code for:
monitoring a plurality of data sources generated by a plurality of user identities of the target computing environment accessing a plurality of service computing environments;
analyzing the plurality of data sources to identify communication between user identities of the target computing environment and the plurality of service computing environments;
according to the analyzing, mapping connections between the user identities of the target computing environment and the plurality of service computing environment, including connections between first user identities that are authorized to access authorized service computing environments, second user identities that are non-authorized to access the authorized service computing environments, and third user identities that are non-authorized to access non-authorized service computing environments; and
automatically blocking access of the second user identities to the authorized service computing environments that they are non-authorized to access, and automatically blocking access of the third user identities to access non-authorized service computing environments.

21. A non-transitory medium storing program instructions for automatically managing access to a plurality of authorized service computing environments from a target computing environment, which when executed by at least one processor, cause the at least one processor to:
monitor a plurality of data sources generated by a plurality of user identities of the target computing environment accessing a plurality of service computing environments;
analyze the plurality of data sources to identify communication between user identities of the target computing environment and the plurality of service computing environments;
according to the analyzing, map connections between the user identities of the target computing environment and the plurality of service computing environment, including connections between first user identities that are authorized to access authorized service computing environments, second user identities that are non-authorized to access the authorized service computing environments, and third user identities that are non-authorized to access non-authorized service computing environments; and
automatically block access of the second user identities to the authorized service computing environments that they are non-authorized to access, and automatically block access of the third user identities to access non-authorized service computing environments.

* * * * *